US011959309B2

(12) United States Patent
Banse

(10) Patent No.: US 11,959,309 B2
(45) Date of Patent: Apr. 16, 2024

(54) MOBILE ELECTRONIC LOCK

(71) Applicant: ABUS August Bremicker Söhne KG, Wetter-Volmarstein (DE)

(72) Inventor: Manuel Banse, Herborn (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 395 days.

(21) Appl. No.: 17/611,695

(22) PCT Filed: May 11, 2020

(86) PCT No.: PCT/EP2020/062995
§ 371 (c)(1),
(2) Date: Nov. 16, 2021

(87) PCT Pub. No.: WO2020/234016
PCT Pub. Date: Nov. 26, 2020

(65) Prior Publication Data

US 2022/0282527 A1 Sep. 8, 2022

(30) Foreign Application Priority Data

May 17, 2019 (DE) ......................... 102019113184.7

(51) Int. Cl.
*E05B 47/00* (2006.01)
*E05B 45/06* (2006.01)
(Continued)

(52) U.S. Cl.
CPC .......... *E05B 47/0012* (2013.01); *E05B 45/06* (2013.01); *E05B 67/063* (2013.01);
(Continued)

(58) Field of Classification Search
CPC ............... E05B 45/06; E05B 2045/065; E05B 2045/067; E05B 47/0012;
(Continued)

(56) References Cited

U.S. PATENT DOCUMENTS 4,528,828 A 7/1985 Poutiainen
5,377,511 A 1/1995 Meckbach
(Continued)

FOREIGN PATENT DOCUMENTS

DE 3400426 A1 7/1984
DE 4323693 A1 1/1995
(Continued)

OTHER PUBLICATIONS

Communication received from the German Patent and Trademark Office for related German Application No. 102019113184.7 dated Apr. 30, 2020, 8 page(s).
(Continued)

*Primary Examiner* — Christopher J Boswell
(74) *Attorney, Agent, or Firm* — Dickinson Wright PLLC

(57) ABSTRACT

A portable electronic lock comprises a lock body and at least one securing part, in particular a U hoop or a bolt, that can be selectively locked to the lock body or released from the lock body. The lock body further comprises a first introduction opening and a second introduction opening for introducing a respective section of the at least one securing part into the lock body; an electromechanical locking device that has a first latch and a second latch, a cam rotatable about an axis of rotation and an electric motor for driving the cam; and a control circuit. The first latch can be displaced by means of the cam from an unlocked position into a locked position in which the first latch engages into the first introduction opening in order to lock the at least one securing part in the first introduction opening, and the second latch can be displaced by means of the cam from an unlocked position into a locked position in which the second latch engages into the second introduction opening in order to lock the at least one securing part in the second intro-
(Continued)

Figure 1:
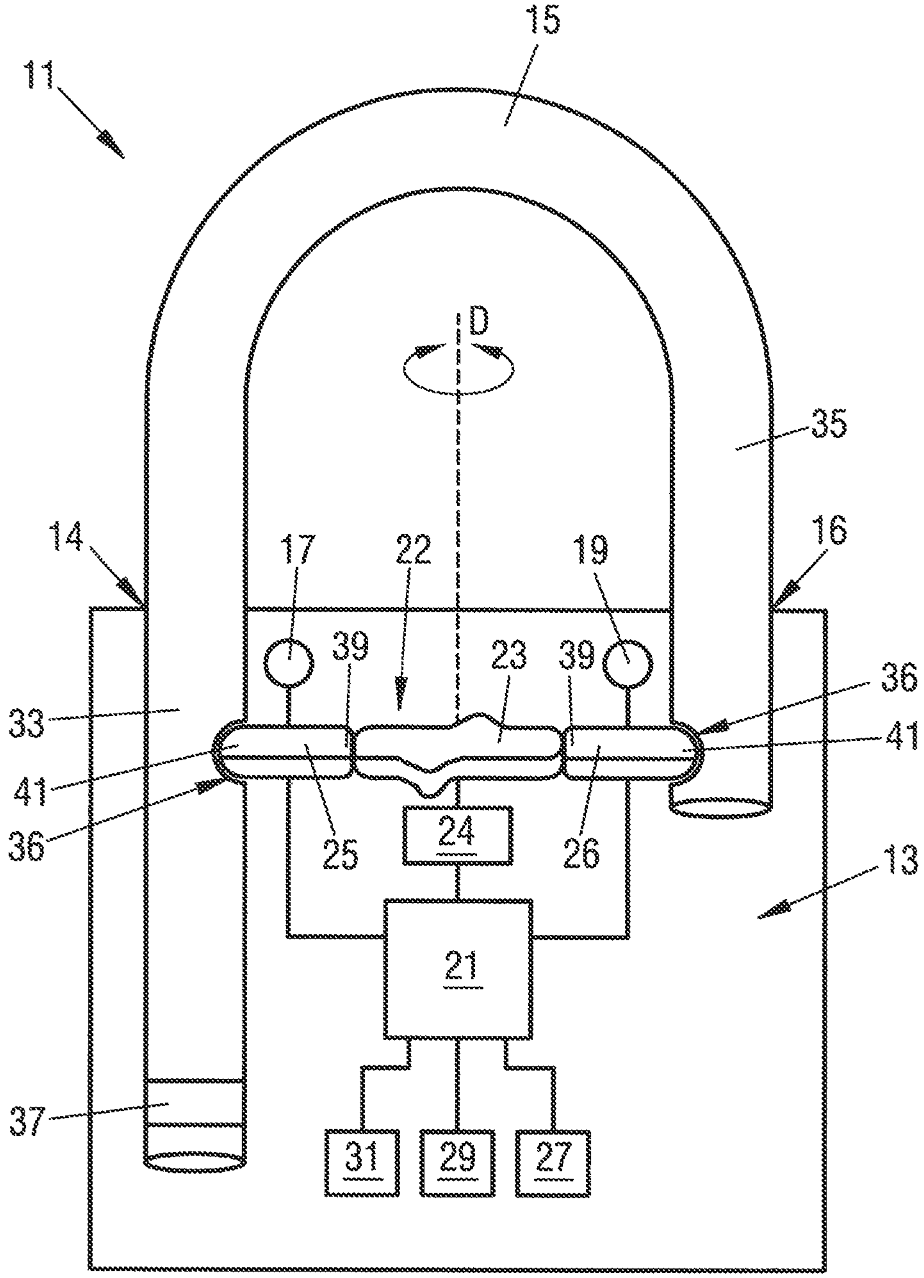

duction opening. The control circuit is configured to control the electric motor to drive the cam.

19 Claims, 5 Drawing Sheets

(51) Int. Cl.
*E05B 67/06* (2006.01)
*E05B 67/22* (2006.01)

(52) U.S. Cl.
CPC ........ *E05B 67/22* (2013.01); *E05B 2045/065* (2013.01); *E05B 2047/0017* (2013.01); *E05B 2047/0024* (2013.01); *E05B 2047/0069* (2013.01)

(58) Field of Classification Search
CPC ..... E05B 2047/0017; E05B 2047/0024; E05B 2047/0025; E05B 2047/0069; E05B 67/063; E05B 67/22
See application file for complete search history.

(56) References Cited

U.S. PATENT DOCUMENTS

| | | | | |
|---|---|---|---|---|
| 6,813,913 | B2 | 11/2004 | Watts | |
| 7,856,855 | B2 * | 12/2010 | Fantl | E05B 67/063 70/38 A |
| 7,921,682 | B1 | 4/2011 | Chang | |
| 8,919,157 | B2 | 12/2014 | Fantl et al. | |
| 9,556,651 | B1 * | 1/2017 | Cabral Herrera | E05B 67/22 |
| 10,422,163 | B1 * | 9/2019 | Cabral Herrera | E05B 67/22 |
| 11,028,618 | B1 * | 6/2021 | Liu | E05B 67/22 |
| 11,193,309 | B1 * | 12/2021 | Cabral Herrera | E05B 67/22 |
| 11,352,817 | B2 * | 6/2022 | Gengler | E05B 67/22 |
| 11,391,067 | B2 * | 7/2022 | George | E05B 67/22 |
| 11,708,707 | B2 * | 7/2023 | Raatikainen | E05B 67/22 70/51 |
| 2015/0292244 | A1 | 10/2015 | Beatty | |
| 2016/0049032 | A1 | 2/2016 | Ranchod | |
| 2016/0333607 | A1 | 11/2016 | Cagan | |
| 2023/0304324 | A1 * | 9/2023 | Millikin | E05B 67/22 |

FOREIGN PATENT DOCUMENTS

| | | | |
|---|---|---|---|
| DE | 212015000020 | U1 | 6/2016 |
| EP | 2607582 | B1 | 4/2019 |
| GB | 2544925 | A | 5/2017 |
| WO | 9839538 | A1 | 9/1998 |
| WO | 2009158326 | A2 | 12/2009 |
| WO | 2015044760 | A1 | 4/2015 |
| WO | 2015045786 | A1 | 4/2015 |
| WO | 2016025306 | A1 | 2/2016 |
| WO | 2018081173 | A1 | 5/2018 |
| WO | 2020154738 | A2 | 7/2020 |

OTHER PUBLICATIONS

International Search Report for International Application No. PCT/EP2020/062995 mailed Jul. 24, 2020, 5 page(s).

* cited by examiner

MOBILE ELECTRONIC LOCK

CROSS-REFERENCE TO RELATED APPLICATIONS

This application is a U.S. National Stage of International Patent Application Serial No. PCT/EP2020/062995, filed May 11, 2020, which claims the benefit of German Patent Application Serial No. 102019113184.7, filed May 17, 2019. The entire disclosures of each of the above applications are incorporated herein by reference.

The invention relates to a portable electronic lock, comprising a lock body and at least one securing part, in particular a U hoop or a bolt, wherein the at least one securing part may be selectively locked to the lock body or released from the lock body, and wherein the lock body comprises a first introduction opening and a second introduction opening for introducing a respective section of the at least one securing part into the lock body.

Such a portable electronic lock may, for example, be configured as a U hoop padlock, wherein a rigid and substantially U-shaped hoop may be introduced into the introduction openings of the lock body and may be locked therein to secure an object. Such a U hoop may, for example, be formed with limbs of equal length such that the two limbs are introduced equally deep into the two introduction openings in a locked position, wherein it is also possible to form the U hoop with limbs of different lengths. In this case, it may be possible to hold the long limb of the U hoop in an introduction opening in an open position of the lock while the short limb is completely released from the lock body such that the U hoop may be pivoted about the long limb. Due to such a pivoting, the short limb may be guided through an object to be secured without the U hoop having to be completely released from the lock body.

Since the securing part may be released, i.e. completely removed, from the lock body, the handling is facilitated in some applications, in particular with regard to the engaging around of an object to be secured by means of the securing part and the subsequent locking to the lock body.

Furthermore, such a portable electronic lock may be configured as a chain lock or cable lock, wherein at least one end of a chain or a cable may be fixedly connected to a bolt that may be introduced as a securing part into an introduction opening of the lock body and may be locked therein. The rope or the chain may thereby be fixedly connected to the lock body to secure an object through which the rope or the chain is guided. In this respect, it is possible that a bolt or a closed loop, by means of which a noose may be formed, may likewise be formed at the other end of the chain or the rope.

Suck locks offer a large number of application possibilities. For example, the locks may be used to secure loads transported in containers or trucks, for which purpose a container door or a tailgate of a truck may be securely closed by the lock. For this purpose, a hoop may, for example, be guided through the eye of a hasp connected to a frame of a door and may be locked to the lock body to securely lock the door.

Locks of the type described may, for example, also be used to secure two-wheelers against an unauthorized removal. For this purpose, the two-wheeler may be connected by means of a lock to a fixed and stationary object, such as a lamppost, a bicycle stand or a fence, and may be secured to it such that a riding away may be prevented.

By equipping a lock with an electrical energy source and an electromechanical locking device, a portable electronic lock may be formed with a plurality of functions with respect to a purely mechanical lock. In this respect, it is particular endeavored to achieve as flexible as possible a use of such a lock for a variety of application possibilities.

It is therefore an object of the invention to provide a portable electronic lock with more comfortable and flexible possibilities of use.

This object is satisfied by a portable electronic lock having the features of claim 1.

In this respect, the lock body comprises an electromechanical locking device that has a first latch and a second latch, a cam rotatable about an axis of rotation, and an electric motor for driving the cam; and a control circuit. The first latch may be displaced from an unlocked position into a locked position in which the first latch engages into the first introduction opening in order to lock the at least one securing part in the first introduction opening, and the second latch may be displaced from an unlocked position into a locked position in which the second latch engages into the second introduction opening in order to lock the at least one securing part in the second introduction opening. The cam is configured, at least

- in a first rotational position, to displace the first latch in the direction of the locked position and to release the second latch for a movement into the unlocked position;
- in a second rotational position, to displace the second latch in the direction of the locked position and to release the first latch for a movement into the unlocked position;
- in a third rotational position, to displace the first latch and the second latch in the direction of the locked position; and
- in a fourth rotational position, to release the first latch and the second latch for a movement into the unlocked position.

Furthermore, the control circuit is configured to control the electric motor to selectively drive the cam (at least) into the first, the second, the third, or the fourth rotational position.

The two latches may be displaced by the cam in the direction of the respective introduction opening to selectively lock the at least one securing part in the locked position, while latches released by the cam may move into an unlocked position to enable a release of at least one securing part from the lock body. In this respect, the rotational movement of the cam about the axis of rotation may in particular be translated into a radial pushing movement of the latches. The driving of the latches to perform the movement into the unlocked position may in particular take place indirectly by the securing part, namely when the securing part is removed from the lock body and in this respect urges the respective latch back in the direction of the unlocked position.

Since the control circuit is configured to selectively control or set the cam into the first, the second, the third, or the fourth rotational position, a flexible use of the lock may be made possible since any desired number of the two latches may selectively and independently of the side be brought into a locked position or into an unlocked position.

In the third rotational position, both the first latch and the second latch are displaced in the direction of the locked position (in particular in the locked position). In this position, a U hoop that is introduced into both introduction openings may, for example, be securely locked to the lock body. Furthermore, two bolts, which are introduced into one of the two introduction openings each, may be simultaneously locked in the respective introduction opening in order, for example, to enable the securing of an object by a chain lock.

Since the first latch may be displaced in the direction of the locked position in the first rotational position, while the second latch is released for a movement into the unlocked position, a bolt may, for example, be locked in the first introduction opening, while a second bolt located in the second introduction opening may be removed through the unlocked position of the second latch or, when the second introduction opening is unoccupied, a further securing part may be introduced. Furthermore, it is possible that a long limb of a U hoop is held in the first introduction opening in this position while the short limb is released from the second introduction opening such that the U hoop may be pivoted about the long limb and the short limb may be guided through an object to be secured.

Due to the second rotational position, in which the second latch may be displaced in the direction of the locked position and the first latch is released, the possibility of, for example, introducing and securing only one securing part into the lock body or pivotably holding a U hoop at the long limb is provided in the case of any desired introduction of a respective securing part into the two introduction openings. Securing parts that are introduced into only one introduction opening for locking may thus be introduced as desired into the two introduction openings and may be selectively and mutually independently locked to or released from the lock.

Furthermore, a U hoop may be introduced in any desired orientation into the lock since a holding of a long limb on a simultaneous release of a short limb is possible irrespective of the introduction opening into which the long limb is introduced. In this connection, the orientation of the securing part in particular refers to an arrangement of the securing part relative to the lock body in different angular positions, for example in two angular positions that differ by 180°. A user is thus not restricted in the use of the lock by a fixed orientation of a U hoop to be introduced or a specific order of the introduction or removal of two individually introduced securing parts such that the full functionality of the lock may be made possible completely independently of the side.

In the fourth rotational position, both the first latch and the second latch are released for a movement into the unlocked position such that the securing parts that are each introduced into the introduction openings may be released from the lock body. Thus, a U hoop may in particular also be released, i.e. completely removed, from the lock body, wherein, due to the possibility of controlling the cam into the first and second rotational positions, it is irrelevant for the functionality of the lock in which orientation the U hoop is subsequently reintroduced by a user. Due to the possibility of completely removing the securing part from the lock body, the flexibility of the usability of the lock body is increased since said lock body may also be used for a plurality of securing parts (that are of the same kind or different).

Such a portable electronic lock consequently allows a freely selectable, variable, electronically controlled locking of the at least one securing part, in particular in any desired orientation, and the introduction of different, mutually distinguishable securing parts with a selective locking to the lock body. In addition to the possibility of introducing a U hoop in any desired orientation into the lock body and locking it, pivotably holding it at a long limb, or completely releasing it from the lock body, it is also possible to lock or to release two securing parts, in particular two bolts, to or from the lock body at the same time, but independently of one another.

Where reference is made in connection with the invention to a cam, this is generally to be understood as an eccentric element that may, for example, be formed by a cam plate or by a slotted part.

The respective latch mentioned in connection with the invention may, for example, have an elongate shape (e.g. generally parallelepiped-shaped, cylindrical, or pin-shaped) or a spherical shape.

Where reference is made to a U hoop in connection with the invention, this is generally understood as a securing part having two end sections that may be introduced into the lock body, wherein the shape of the securing part does not have to be exactly U-shaped, but may, for example, also be angular or Ω-shaped (omega-shaped, i.e. with a bulge).

Further possible embodiments result from the description, from the claims, and from the drawings.

In some embodiments, with respect to the axis of rotation, that is in the radial direction, the cam may,

- in the first rotational position, have a larger extent in the direction of the first introduction opening than in the direction of the second introduction opening;
- in the second rotational position, have a larger extent in the direction of the second introduction opening than in the direction of the first introduction opening;
- in the third rotational position, have a first extent of the same kind in the direction of the first introduction opening and in the direction of the second introduction opening; and
- in the fourth rotational position, have a second extent of the same kind, which is smaller than the first extent of the third rotational position, in the direction of the first introduction opening and in the direction of the second introduction opening.

Said first extent of the cam may in particular correspond to the extent provided in in the direction of the first introduction opening the first rotational position and to the extent provided in the direction of the second introduction opening in the second rotational position. Said second extent of the cam may in particular correspond to the extent provided in the direction of the second introduction opening in the first rotational position and to the extent in the direction of the first introduction opening provided in the second rotational position. It is also possible that the extent of the cam provided in the direction of the first introduction opening in the first rotational position of the cam and/or the extent of the cam provided in the direction of the second introduction opening in the second rotational position of the cam is/are smaller than said first extent of the cam in order to enable a locking intermediate position of the respective latch.

In the rotational positions, the cam, in its function, in each case represents a radial elevated portion along a connection line from the axis of rotation to the first introduction opening and a radial elevated portion along a connection line from the axis of rotation to the second introduction opening, wherein the latches may be brought into a locked position by the contact with the cam in the case of a respective sufficient extent. In the case of a smaller extent of the cam in the direction of a respective introduction opening, the contact with the associated latch consequently takes place further radially inwardly disposed such that the latches may be released for a movement into the unlocked position in the case of a sufficiently small extent of the cam.

In this respect, the axis of rotation may in particular extend in parallel with and at the same spacing from the two introduction openings of the lock body and through the center of the cam. The center of the rotatable cam may thus be equally far away from the two introduction openings such that the setting of the latches in the respective rotational positions may be predefined by the extent of the cam from its center in the direction of the associated introduction opening. Accordingly, in the first and second rotational positions, the cam may in each case have a larger extent in the direction of the introduction opening whose associated latch is brought into the locked position, while the latch associated with the respective other introduction opening, due to the smaller extent of the cam in this direction, is released for a movement into the unlocked position.

Since both the first latch and the second latch are displaced in the direction of the locked position in the third rotational position, while the two latches are released for a movement into the unlocked position in the fourth rotational position, the cam may have an extent of the same kind in the direction of the two introduction openings in each of these two rotational positions. In this respect, this extent is smaller in the fourth rotational position than in the third rotational position to enable the release of the latches. In this respect, it is in each case decisive for the extents of the cam in the direction of the two introduction openings that a secure locking of the securing part by both latches may be achieved in the third rotational position and the release of both latches may be achieved in the fourth rotational position. Accordingly, the extent of the cam in the direction of the first introduction opening may in each case correspond to the extent of the cam in the direction of the second introduction opening in the third or in the fourth rotational position, wherein deviations from an extent of the same size are insignificant provided that a reliable setting of the latches into the respective intended position may be ensured.

The cam may be displaceable with respect to the axis of rotation by a rotation about 180° from the first rotational position into the second rotational position. The cam may be displaceable by a rotation about 180° from the third rotational position into a fifth rotational position in which, with respect to the axis of rotation, the cam again has the first extent in the direction of the first introduction opening and in the direction of the second introduction opening. The cam may be displaceable by a rotation about 180° from the fourth rotational position into a sixth rotational position in which, with respect to the axis of rotation, the cam again has the second extent in the direction of the first introduction opening and in the direction of the second introduction opening. The control circuit may in particular be configured to control the electric motor to selectively drive the cam into fifth or the sixth rotational position. In particular since the first and second rotational positions may be disposed offset by 180° from one another, the cam may be formed in a simple manner since the respective necessary extents of the cam in the direction of the two introduction openings to enable the desired positions of the latches may be achieved by the same shaping of the cam. Since a fifth and a sixth rotational position may also be controlled, wherein in the fifth rotational position, as in the third rotational position, both latches may be set into the locked state and in the sixth rotational position, as in the fourth rotational position, both latches may be released for a movement into the unlocked position, a symmetrical control or transfer into the respective rotational and latch positions may be achieved.

In some embodiments, the cam may be freely rotatable about at least 360°. This makes it possible to arrange the respective rotational positions offset from one another as far as possible and to achieve a guidance of the latches that is as uniform and smooth as possible such that abrupt transitions of the latches from a locked position into an unlocked position or vice versa may be avoided. Furthermore, in particular with the possibility of rotating the cam about more than 360°, a respective desired rotational position may be controlled in as direct a manner as possible, starting from a specific rotational position, without the cam having to be guided through further rotational positions during the movement.

To facilitate a free rotatability of the cam in cooperation with the latches, the cam may have a completely rounded contour along the periphery, i.e. without edges or steps.

Provision may be made that the electric motor has a reduction gear and/or is self-locking. This may enable a controlled and precise control of a desired rotational position.

In some embodiments, the first latch and the second latch may be spring-preloaded in the direction of their respective locked position. The respective latch thereby does not have to be moved by the cam, but only has to be released for a movement into the unlocked position. Since the latches are spring-preloaded in the direction of their respective locked position, and thus radially outwardly away from the axis of rotation of the cam, the cam may be freely rotatable while the latches are in their respective locked position. The driving of the latches in the direction of their respective unlocked position may in this respect take place indirectly by the securing part, namely when the securing part is removed from the lock body and in this respect urges the respective latch in the direction of the unlocked position. Alternatively, it is also possible for the cam to actively displace the latches from the respective locked position into the respective unlocked position, for instance by means of a slot guide.

Provision may be made that the first latch and the second latch are linearly movably guided in the lock body. Due to such a linear guidance of the latches, their movement from a locked position into an unlocked position may take place in a controlled and defined manner, wherein the guides may in particular extend perpendicular to an axis of the respective introduction opening. Furthermore, a stable support of the latches in the axial direction may be achieved by such a guidance such that the security of the lock may be increased with respect to break-open attempts in which a force is applied to the latches from the axial direction.

In some embodiments, with respect to the axis of rotation, the first latch and the second latch may have a radially inwardly disposed contact region for cooperating with the cam and a radially outwardly disposed engagement region for cooperating with the at least one securing part for the locking of said at least one securing part, wherein the contact region and/or the engagement region may be at least sectionally rounded. In this respect, the contact region may in particular be rounded in the radial direction and may e.g. sectionally extend in the shape of an arc of a circle such that a smooth cooperation with the cam, which may likewise be rounded in the transition regions between the respective rotational positions, may be achieved. The engagement region of a latch may be provided extending in a rounded manner in the axial direction such that as precise as possible an engagement into a recess formed at a securing part for the locking of said securing part and a smooth introduction into such a recess may be made possible.

In some embodiments, the first latch and the second latch may have lateral guide sections, wherein the guide sections may in particular be wing-shaped or groove-like and may cooperate with a corresponding linear guide formed at the lock body.

Since the first latch and the second latch may have lateral guide sections, the latches may be guided in a controlled and defined manner during the control of different rotational positions or latch positions. In this respect, the guide sections may in particular be wing-shaped or groove-like and may cooperate, in particular cooperate in a form-fitted manner, with a linear guide formed at the lock body such that, in addition to the controlled guidance of the latches, a secure support of the latches in their axial position may be achieved.

The lateral guide sections may further form an abutment to prevent the latches from engaging too deeply into the respective introduction opening in their locked position or even from falling into the respective introduction opening when no securing part is inserted into the lock body or into the respective introduction opening. For this purpose, the guide sections or the associated linear guide (e.g. a groove) may have a defined limited extent.

In some embodiments, a first sensor for detecting the securing part introduced into the lock body and for generating corresponding detection signals may be associated with the first introduction opening and a second sensor for detecting the securing part introduced into the lock body and for generating corresponding detection signals may be associated with the second introduction opening. An introduced securing part and the introduction opening into which it is introduced may consequently be detected by these sensors, wherein this information may, if necessary, be further processed or made available to a user.

The respective sensor may have an electromechanical contact switch, a capacitive proximity switch, a magnetic switch, an optoelectronic interruption switch, or an optoelectronic proximity switch. The design of the sensor may thus be adapted to the respective requirements or the area of use of the lock, wherein the sensor may in particular be configured such that a simple actuation by a respective provided securing part and thus a simple possibility of detecting said securing part may be achieved.

In some embodiments, the control circuit may be configured to determine a current occupancy state of the lock body in dependence on the generated detection signals, wherein the control circuit may be configured to associate different combinations of generated detection signals with different occupancy states of the lock body.

In this respect, the occupancy state of the lock body may in particular be determined by the type of an introduced securing part as well as its orientation and the depth of the introduction. Since the control circuit may be configured to determine the current occupancy state of the lock body from the combination of the generated detection signals, this occupancy state may, for example, be evaluated and the information included therein on an introduced securing part may be further processed, which may enable a flexible control or use of the lock adapted to the respective occupancy state.

Provision may be made that respective information on permitted positions of the first latch and the second latch is stored in the control circuit for the different occupancy states of the lock body. For this purpose, a non-volatile memory may be provided by which an allocation table or a look-up table may be provided in which the respective information is available. This non-volatile memory may in this respect be provided either as an integral component of the control circuit or as a separate component connected to the control circuit.

In dependence on the respective occupancy state of the lock body, different positions of the two latches may be sensible and may thus be classified as permitted. If the two latches are, for example, controlled into a locked position while no securing part is introduced into the lock body, damage to the latches, their guide, or the securing part may occur on a subsequent introduction through an abutting of the securing part at the latches. Since a locked position of the two latches with the safety component removed may be identified as not permitted on the basis of the detected occupancy state, this information may be taken into account in the control. Thus, only one control signal may be output for a control of the fourth and, if provided, the sixth rotational position of the cam, in which both latches are released for a movement into the permitted unlocked position, while the other rotational positions, in which at least one of the latches is brought into the locked position, are not controlled. Due to the possibility of associating permitted positions of the latches with the occupancy states, damage to the components of the lock may thus possibly be prevented.

The control circuit may be configured to control the locking device in dependence on the generated detection signals. This control may, for example, take place in the form of a permissibility check in that only one control signal is output for rotational positions of the cam that require permitted positions of the latches while taking account of the current occupancy state. Damage to the components of the lock may thereby in particular be prevented by transferring the latches into impermissible positions. In addition to the possibility described in the preceding paragraph of damage to the latches or their guide if a latch is brought into a locked position when the securing part is removed, an attempt to guide a latch into the locked position while it is blocked by a securing part that is not completely introduced may, for example, also lead to an overload of the electric motor for driving the cam. If the locked position of the respective latch is therefore detected as currently not permitted and is only permitted when the securing part is completely introduced and this information is taken into account in the control, such overloads of the electric motor may also be prevented.

In addition to the taking into account of the current occupancy state in the control in the form of a permissibility check, provision may also be made that the latch positions are automatically controlled on the basis of the current occupancy state. Thus, provision may, for example, be made that the cam is automatically transferred into the fourth or, if provided, the sixth rotational position for releasing both latches for a movement into the unlocked position if it is detected that no securing part is introduced into the lock body. This may enable a subsequent introduction of any desired securing part in any desired orientation, wherein it may be automatically ensured that none of the latches blocks the securing part to be introduced during the introduction. Provision may likewise be made to perform an automatic locking by transferring the cam into the third or, if applicable, the fifth rotational position when the complete introduction of a securing part is detected.

In some embodiments, the lock body may have a radio module that is connected to the control circuit. Due to this radio module, a communication with the user may be made possible without the user having to be in the direct vicinity of the lock. This may, for example, take place in that the radio module allows the establishing of a connection via Bluetooth or mobile radio. Due to the connection of the radio module to the control circuit, it may further be possible to operate said control circuit via radio such that a user may, for example, release a secured object for a person present in its environment without the user himself having to be in the direct vicinity of the lock.

The radio module may be configured to transmit the current occupancy state of the lock body as a radio signal. In this respect, only information on the occupancy state that is evaluated on a reception device of the user, for example on a mobile radio device, may be transmitted such that the information included in the occupancy state is made available to the user or this information may already be evaluated and separately transmitted by the control circuit. Due to the transmission of the current occupancy state of the lock body, the user may, for example, be made aware of the possibilities of controlling the lock that result for this occupancy state or the need for further actions. For example, if it is recognized that a securing part is only introduced into one of the introduction openings, the user may be prompted to introduce, if necessary, a further securing part or a closure for the further introduction opening to prevent an entry of contamination or of liquid into the lock body and damage resulting therefrom. Furthermore, the lock may be protected against possible break-open attempts, which take place through an unclosed introduction opening, by closing both introduction openings.

The radio module may be configured to receive a control command for the locking device by radio, wherein the control circuit may be configured to control the locking device in response to the received control command. Accordingly, a user may control the locking device via radio and thus without being in the direct vicinity of the lock. Thus, it is, for example, possible to grant access to the secured object to a person who is in the vicinity of the lock.

The lock body may have a GPS receiver to determine a current position of the lock body, wherein the radio module may be configured to transmit the determined current position as a radio signal. Due to the transmission of the current position of the lock via radio, a user may always be informed about where the lock and in particular an object secured by the lock are located. This may in particular be relevant when moving objects are secured by the lock such that the transport of goods stored in a container locked by the lock may, for example, be monitored and tracked.

In some embodiments, the lock body may have an alarm device that may in particular comprise a circuit monitoring, a tamper contact, the first and second sensors already mentioned, an acceleration sensor, and/or a vibration sensor. The security of the lock may be further increased by such an alarm device since any break-open attempts or manipulation attempts may be made more difficult by triggering an alarm and attracting the attention of people in the vicinity. Since forces are usually applied to the lock in such break-open attempts, whereby said lock experiences a vibration or a change in position, alarm devices may comprise acceleration sensors or vibration sensors that recognize such intrusions. Furthermore, the alarm device may comprise the first sensor and the second sensor for detecting an introduced securing part such that a break-open attempt may be recognized and an alarm may be triggered by a change in the occupancy state of the lock body that is not due to an action of the user.

The control device may be configured to control the alarm device. In this respect, for the purpose of saving energy, the control circuit may in particular be configured to switch off the alarm device if the generation of an alarm is not desired. This may, for example, be the case when the lock is not used to secure an object and is, for example, being transported, wherein the triggering of an alarm, in particular due to detected vibrations, is usually not desired. Furthermore, this control may also take place while taking account of the current occupancy state such that the alarm device may, for example, be switched off if it is recognized that no securing part is currently introduced and that the lock is thus not in use.

The radio module may be configured to transmit an alarm as a radio signal. A user may thereby be informed of a recognized break-in attempt even if he is not in the direct environment of the lock. This may enable the user to initiate or perform the necessary measures in order to prevent a theft of the secured object.

The radio module may be configured to receive a control command for the alarm device by radio, wherein the control circuit may be configured to control the alarm device in response to the received control command. This may in particular enable the user to selectively switch the alarm device on or off. Thus, a user may, for example, suppress the generation of the alarm when he is not currently using or transporting the lock in order to save energy or to prevent the triggering of an unwanted and possibly disruptive alarm.

The lock body may have an electrical energy source for the energy supply of further components of the portable electronic lock, wherein the control circuit may be configured to control the energy supply of at least one of the further components, in particular in dependence on the determined current occupancy state of the lock body. It may thereby again be achieved to minimize the energy consumption of the portable electronic lock in a manner adapted to the current use and to achieve as long as possible a usability of the lock without interruptions for changing or charging the energy source. This control of the energy supply may in particular take place while taking account of the current occupancy state of the lock body in that, for example, some components, such as an alarm device, a radio module or a GPS receiver, are switched off if it is recognized that no securing part has been introduced into the lock body and that no securing part is therefore in use.

The invention further relates to a lock system comprising a portable electronic lock in accordance with any one of the embodiment examples described above and at least one further securing part, wherein the one securing part and the further securing part are configured to trigger the generation of different combinations of detection signals when either the one securing part or the further securing part is introduced into the introduction openings of the lock body. Such a lock system may consequently comprise a plurality of securing parts (for example, two, three, or four different types of securing parts) that may each be introduced into and selectively locked to the lock body. Since they are configured to trigger different combinations of detection signals, it is possible to identify the respective securing part and, if necessary, to perform the control of the lock in a manner adapted to the securing part. This may enable a flexible use of the lock in that a plurality of different securing parts may be selectively locked to the lock body and as desired.

The control circuit may be configured to associate the different combinations of detection signals with a respective securing part. In this respect, a non-volatile memory may be provided as a part of the control circuit or as a component connected thereto, wherein the information on the respective securing part may be available in an allocation table or a look-up table. Due to this unambiguous association of detection signals with a respective securing part, the latter may be identified and the control may be performed while taking account of the type of the securing part or the number of introduced securing parts. The user may thus flexibly lock a plurality of different securing parts to the lock body, wherein a consistently high functionality of the lock may be ensured.

The invention further relates to a portable electronic lock, comprising a lock body and at least one securing part, in particular a U hoop or a bolt, wherein the at least one securing part may be selectively locked to the lock body or released from the lock body, and wherein the lock body comprises: a first introduction opening and a second introduction opening for introducing a respective section of the at least one securing part into the lock body; an electromechanical locking device that has a first latch and a second latch, a cam rotatable about an axis of rotation, and an electric motor for driving the cam; and a control circuit; wherein the first latch may be displaced from an unlocked position into a locked position in which the first latch engages into the first introduction opening in order to lock the at least one securing part in the first introduction opening, and wherein the second latch may be displaced from an unlocked position into a locked position in which the second latch engages into the second introduction opening in order to lock the at least one securing part in the second introduction opening; wherein the cam is configured, in a first rotational position, to displace the first latch in the direction of the locked position and to release the second latch for a movement into the unlocked position; and in a second rotational position, to displace the second latch in the direction of the locked position and to release the first latch for a movement into the unlocked position, wherein the control circuit is configured to control the electric motor to selectively drive the cam (at least) into the first or the second rotational position.

In other words, while maintaining the idea of the invention explained above, but in a simplified embodiment, said third rotational position of the cam, in which the cam displaces the first latch and the second latch in the direction of the locked position, and/or said fourth rotational position of the cam, in which the cam releases the first latch and the second latch for a movement into the unlocked position, is/are not absolutely necessary. For example, provision may be made that, in the first rotational position of the cam, only the first latch locks a long limb of the securing part (in particular of a U hoop) and/or holds it in a part unlocking (cf. the first rotational position (S1) in FIG. 3A), wherein the securing part may be completely removed when the first latch is released for a movement into the unlocked position in the second rotational position of the cam. In the second rotational position of the cam, only the second latch may again lock the long limb of the securing part and/or hold it in a part unlocking when the securing part is introduced in the reverse orientation into the lock body (cf. FIG. 3B in comparison with FIG. 3A; in particular also a part unlocking (S2) in FIG. 3B). Further rotational positions may also be provided for the cam in this embodiment of the invention, in particular to also enable a locking intermediate position of the respective latch. In this embodiment, the cam may generally have a relatively simple shape since fewer rotational positions or latch positions are required. With respect to the axis of rotation, that is in the radial direction, the cam may in particular, in the first rotational position, have a larger extent in the direction of the first introduction opening than in the direction of the second introduction opening and, in the second rotational position, have a larger extent in the direction of the second introduction opening than in the direction of the first introduction opening. In another respect, the other further developments of the embodiment explained above with (at least) four rotational positions are also possible in a manner corresponding to the simplified embodiment with (at least) two rotational positions.

The invention will be described in the following purely by way of example with reference to the drawings. They only represent possible embodiments, wherein further embodiments may be seen from the description and the claims.

Figure 2:
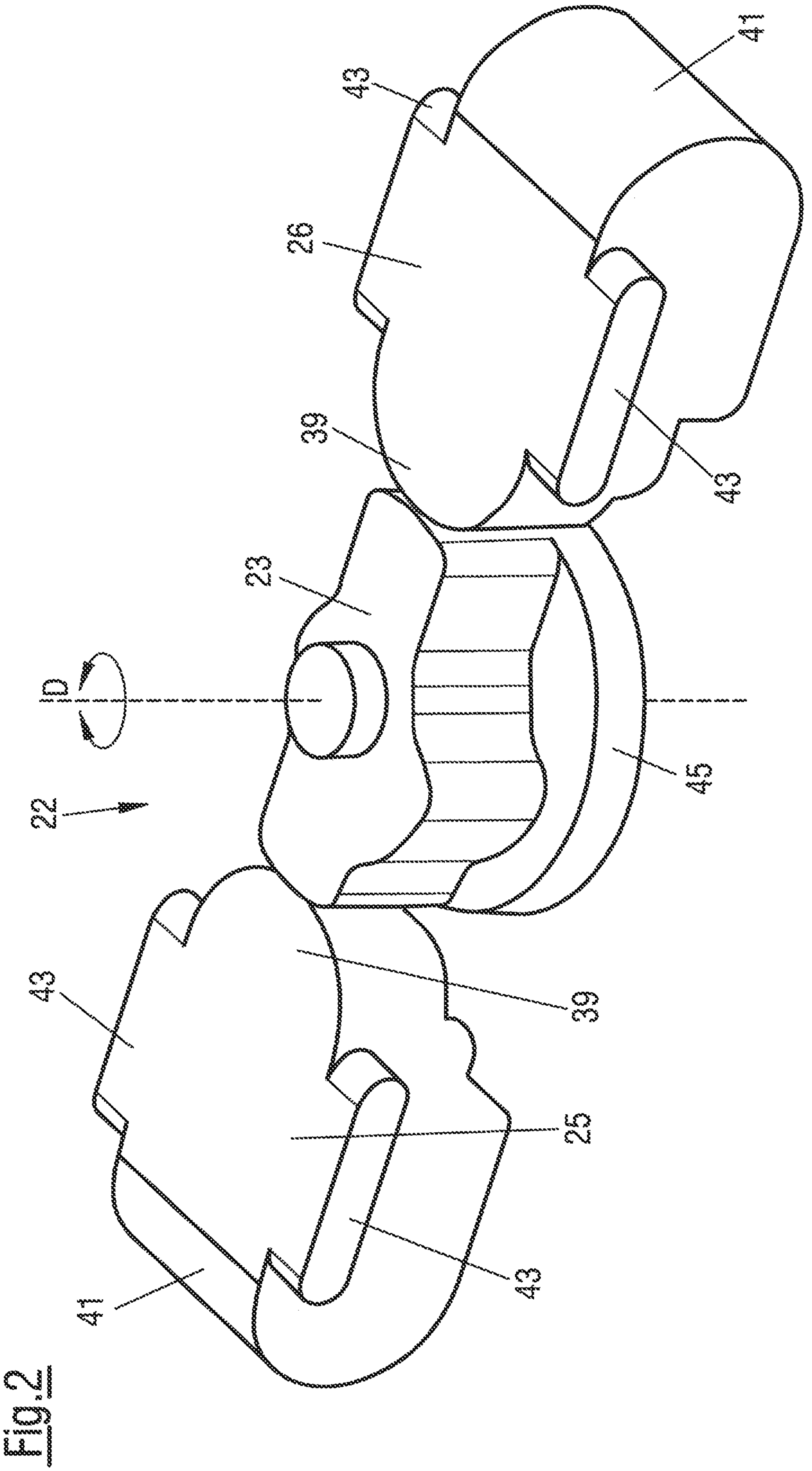
Figure 3A:
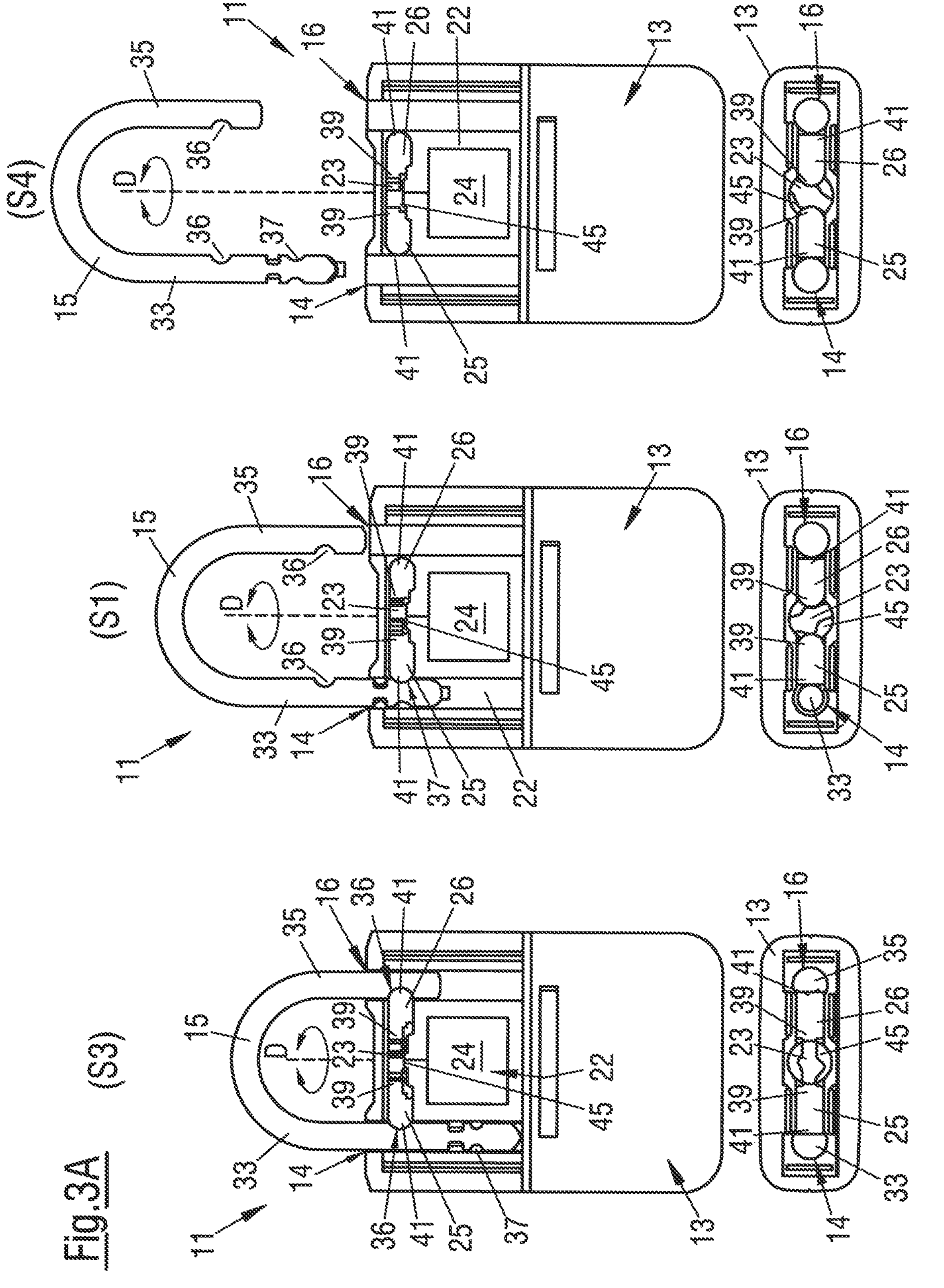
Figure 3B:
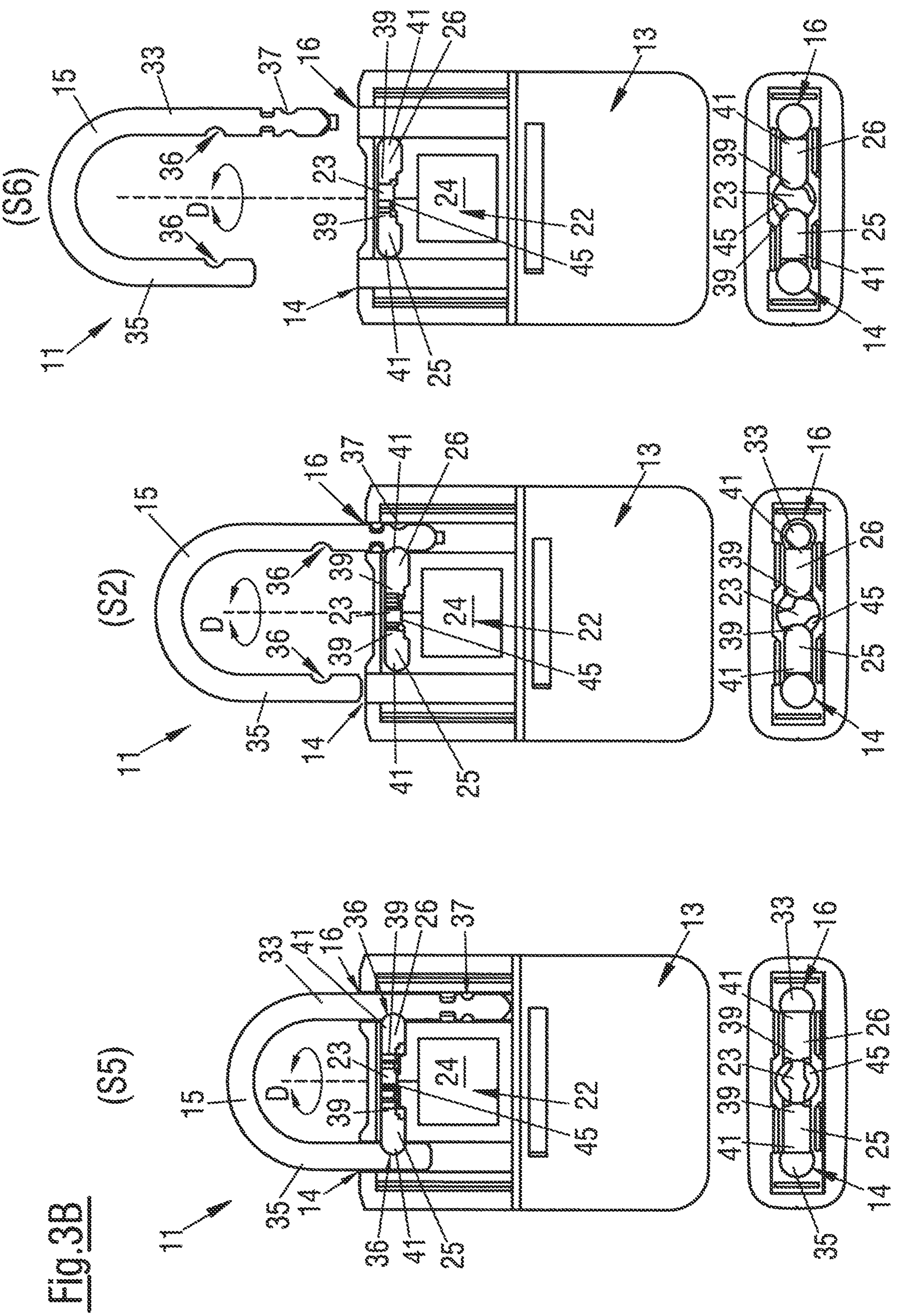
Figure 4:
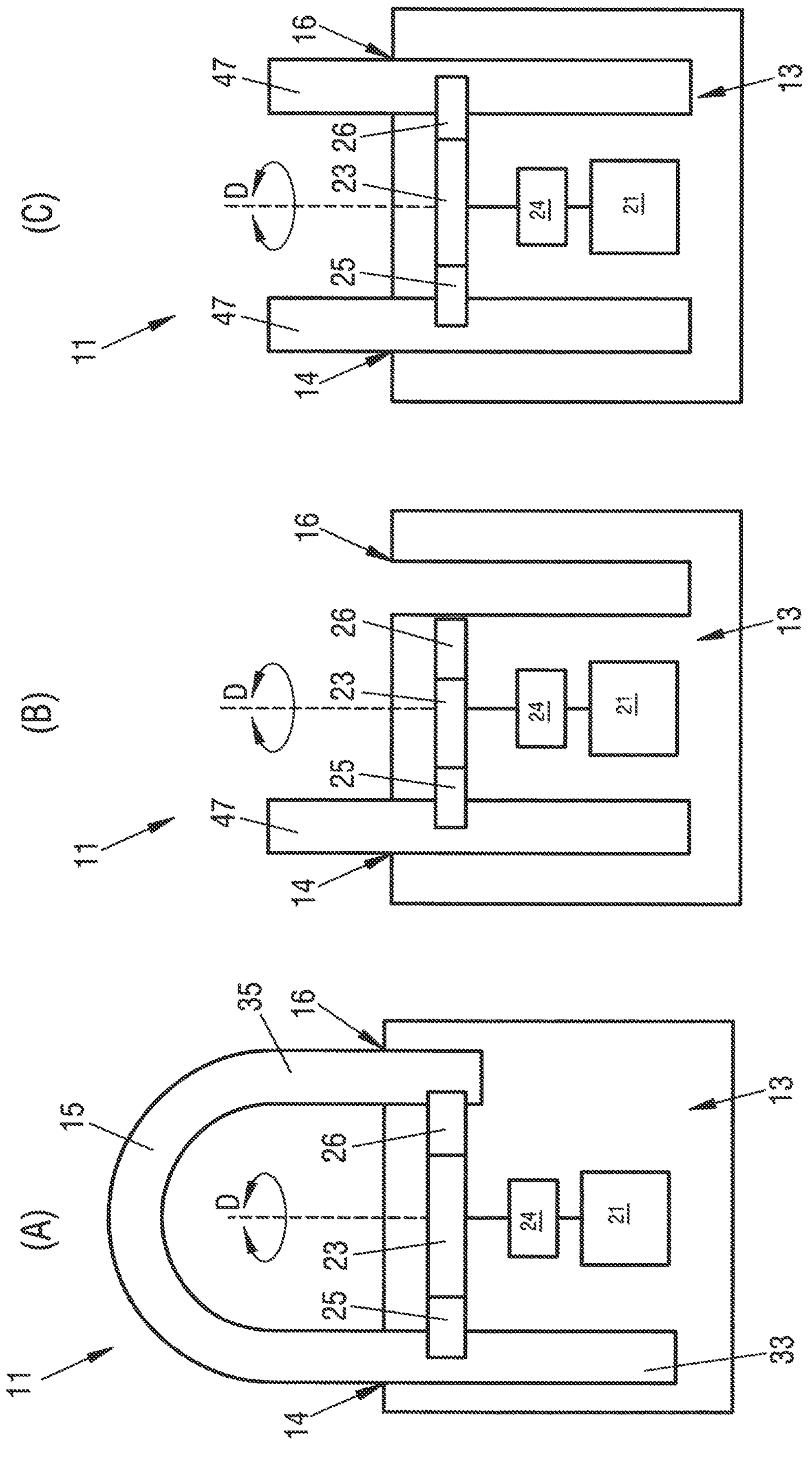

There are shown:

FIG. 1 a schematic representation of a portable electronic lock that is configured as a padlock with a U hoop, FIG. 2 a representation of a cam in contact with two latches for locking a securing part;

FIGS. 3A and 3B respective representations of a portable electronic lock for six rotational positions of the cam for a selective locking of a U hoop independently of the side; and FIG. 4 schematic representations of occupancy states of a lock body with a securing part configured as a U hoop and with further securing parts configured as bolts to illustrate their selective locking.

The portable electronic lock schematically shown in FIG. 1 is configured as a U hoop padlock that has a rigid and substantially U-shaped hoop as the securing part 15. This securing part 15 is formed with two limbs 33 and 35 of different lengths, wherein the long limb 33 is introduced into the introduction opening 14 of the lock body 13 and the short limb 35 is introduced into the introduction opening 16 of the lock body 13 for locking.

This representation only serves for a schematic illustration of a portable electronic lock 11. However, said portable electronic lock 11 may also be configured in another way, for example as a rope or chain lock, such that two securing parts, which are configured as bolts and which are connected to the outer ends of a rope or to the outer links of a chain, may be introduced into the introduction openings 14 and 16 and may be locked there. Furthermore, a portable electronic lock 11 configured as a U hoop padlock may, for example, also have a U hoop having limbs of equal length as the securing part.

To lock the securing part 15, the portable electronic lock 11 comprises an electromechanical locking device 22 that has two latches 25 and 26 for locking the securing part 15 in the introduction openings 14 and 16. In this respect, the latch 25 serves for the locking of the securing part 15 in the introduction opening 14 and, in the locked position shown, engages into a recess 36 of the long limb 33, while the latch 26 is associated with the introduction opening 16 and correspondingly engages into a recess 36 of the short limb 35.

The locking device 22 further has a cam 23 which is rotatable about an axis of rotation D by means of an electric motor 24 and by whose rotational movement the latches 25 and 26 may selectively be brought into a locked position or released for a movement into the unlocked position. The axis of rotation D is in this respect provided in parallel with the introduction openings 14 and 16 (or corresponding rectilinear introduction passages) and extending through the center of the cam 23 such that the cam 23 extends as a respective elevated portion in the radial direction along the connection line of the two introduction openings 14 and 16 and cooperates with a contact region 39 of the latches 25 and 26 to guide them into the locked position shown.

The cam 23 may be driven and may be set into a rotation by means of the electric motor 24. In this respect, the cam 23 may be set into different rotational positions, in each of which a different number or selection of the latches 25 and

26 are brought into the locked position. To illustrate this settability, the cam 23 and the latches 25 and 26 are shown slightly in perspective in FIG. 1, wherein the possibilities of flexibly controlling and using the lock 11 that result from such a design of the cam 23 may in particular also be seen from FIGS. 3A and 3B.

To enable a free settability of the cam 23 and to be able to control the different rotational positions as directly as possible, the cam 23 may be freely rotatable about at least 360° and may in particular be freely rotatable as desired (cf. also FIGS. 3A and 3B). Furthermore, the electric motor 24, by means of which the cam 23 is moved, may have a reduction gear or be self-locking such that a precise setting of a desired rotational position may take place.

The latches 25 and 26 may be spring-preloaded in their respective locked position, wherein the latches 25 and 26 are moved into an unlocked position on a release by the cam 23 by means of the securing part 15—namely by the removal of the securing part 15 from or out of the lock body 13. The cam 23 may thereby generally be freely rotatable and there does not have to be a fixed connection to the latches 25 and 26.

The electric motor 24 is connected to a control circuit 21 by which the electric motor 24 may be controlled. By means of the control circuit 21, the cam 23 may thus be transferred into the rotational position in which the desired number of the latches 25 and 26 or of one of the latches 25 and 26 is in a locked position. Thus, due to the setting of the cam 23, it is possible to bring both latches 25 and 26 into a locked position, to bring both latches 25 and 26 into an unlocked position, or to bring a respective one of the latches 25 or 26 into a locked position while the other one of the latches 26 or 25 is released for a movement into the unlocked position (cf. also FIGS. 3A and 3B).

The respective latch 25 or 26 guided into the locked position may be freely selectable in such a design of the cam 23 such that a securing part 15, such as the U hoop shown, may be introduced in any desired orientation into the lock body 13 and may be locked as desired. Thus, the U hoop, as shown, may be completely introduced and locked or may only be held at the long limb 33, while the short limb is released from the lock body 13. Due to the settability of the cam 23, it is in this respect irrelevant into which one of the introduction openings 14 or 16 the long limb 33 is introduced. A complete release of the securing part 15 is also possible by releasing both latches 25 and 26 for a movement into the unlocked position. Furthermore, any desired number of securing parts, for example one or two bolts, to be introduced into only one of the introduction openings 14 or 16 for locking may be introduced into the lock body 13 and may be locked or removed as desired. This enables a free and flexible use of the portable electronic lock 11 in that a plurality of different securing parts may be locked to the lock body 13 in any desired manner.

A respective sensor 17 or 19 is arranged at the introduction openings 14 and 16 and is configured to detect an introduced securing part 15. These sensors 17 and 19 may, for example, have an electromechanical contact switch. In this respect, the actual design of the sensors 17 and 19 may in particular be adapted to the area of use of the lock 11, wherein a simple actuation of the sensors 17 and 19 by an introduced securing part 15 may be provided for the detection of said introduced securing part 15.

The sensors 17 and 19 are connected to the control circuit 21, wherein said control circuit 21 may be configured to determine the respective occupancy state of the lock body 13 from the combinations of the detection signals of the sensors 17 and 19.

In this respect, such an occupancy state of the lock body 13 is in particular given by the number of introduced securing parts, their design, for example as a U hoop or as a bolt, the orientation of the respective introduced securing parts 15, and the depth of the introduction. The occupancy state of the representation shown thus corresponds to an occupancy of the lock body 13 by a completely introduced securing part 15 configured as a U hoop having limbs 33 and 35 of different lengths, wherein said securing part 15 is oriented such that the long limb 33 is introduced into the introduction opening 14 and the short limb 35 is introduced into the introduction opening 16. A further possible occupancy state, for example, results in that the short limb 35 is released from the lock body 13, while the long limb 33 is held at the lock body 13 by an engagement of the latch 25 into the annular groove or peripheral notch 37 formed at the lower end of the long limb 33 such that the securing part 15 may be pivoted about the long limb 33 and an object to be secured may be guided through the short limb 35. Further occupancy states of the lock body 13 with a securing part 15 configured as a U hoop are also shown in FIGS. 3A and 3B and may further, for example, result due to the introduction of one or two bolts into the introduction openings 14 and 16.

Since the control circuit 21 is configured to associate the combinations of the detection signals of the sensors 17 and 19 with an occupancy state, the information included in the occupancy state may be determined and may, for example, be taken into account in the control of the locking device 22 or of the electric motor 24. For this purpose, the control circuit 21 may have a non-volatile memory in which information on an introduced securing part 15 is stored for the respective occupancy state. This non-volatile memory may, as shown, be directly integrated into the control circuit 21 or may be structurally separate therefrom, but connected thereto and may provide an allocation table or a look-up table in which such information is available. Since the control circuit 21 may be configured to determine the occupancy state of the lock body 13 from the combinations of the detection signals of the sensors 17 and 19, the introduced securing part 15 may thus be identified and this information may be made available to a user or taken into account in the control of the lock 11.

Furthermore, information on permitted latch positions in the case of a specific current occupancy state of the lock body 13 may be stored in a non-volatile memory integrated in or connected to the control circuit 21. This information may also be made available in the form of an allocation table or a lookup table.

The information determined from the current occupancy state may be taken into account by the control circuit 21 in the control of the electric motor 24 or of its drive to set the cam 23. In this respect, a permissibility check may in particular take place for the positions of the latches 25 and 26 and only one control signal may be output for permitted latch positions. If it is, for example, recognized on the basis of the current occupancy state that no securing part 15 is introduced into the lock body 13, the locked positions of the latches 25 and 26 may be recognized as impermissible and no control signal may be output for the transfer of the latches 25 and 26 into the locked position. A transfer of the latches 25 and 26 into the locked position when the securing part 15 is removed could have the result that the latches 25 and 26, a linear guide, not shown, of the latches 25 and 26 in the lock body 13, or the securing part 15 are damaged on a subsequent introduction and abutment with the latches 25 and 26. Furthermore, provision may, for example, be made that the control circuit 21 automatically transfers the latches 25 and 26 into the locked position by means of a driving of the cam 23 by the electric motor 24 when the complete introduction of a securing part 15 introduced into both introduction openings 14 and 16 or of two securing parts, which are each introduced into one of the introduction openings 14 and 16, results from the current occupancy state.

The portable electronic lock 11 further has a radio module 27 that is likewise connected to the control circuit 21. This radio module allows a communication with a user of the lock 11, wherein this communication may, for example, take place via a Bluetooth or mobile radio connection. A user may thus in particular control the control circuit 21 and, through it, the electric motor 24 by a radio command transmitted to the radio module 27. In this respect, the latches 25 and 26 may each be selectively and individually brought into a locked position or an unlocked position without a direct manual intervention being necessary for this purpose or the user having to be in the direct vicinity of the lock 11. For example, an object secured by the lock 11 may thus be selectively released for a person in the vicinity of said object. The radio module 27 may further be configured to transmit the current occupancy state of the lock body 13 as a radio signal and to communicate it to a user such that the user may always be informed of the occupancy state. The transmission of the occupancy state may, for example, also be used to indicate possible or necessary further actions, such as a locking after the introduction of the securing part 15, to the user.

A GPS receiver 29, by which the current position of the lock 11 may be determined and may be transmitted as a radio signal by the radio module 27, is likewise arranged in the lock body 13 and connected to the radio module 27. A user may thereby be informed of the current position of the lock 11 at any time. It may thus in particular be made possible to check and track the position of objects at any time that are moved, for example transported in a container, and that are secured by the lock 11.

Furthermore, an alarm device 31 is connected to the control circuit 21 by which the security of the lock 11 may be further increased in that an alarm is triggered during recognized break-open attempts or manipulation attempts. To recognize such a break-open attempt or manipulation attempt, the alarm device 31 may in particular comprise a circuit monitoring, a tamper contact, the two sensors 17 and 19, an acceleration sensor, and/or a vibration sensor. Since large forces are often applied to the lock 11 during a break-open attempt, said lock 11 in this respect usually experiences a vibration or a change in position. This may be detected by an acceleration sensor or a vibration sensor such that its signal may serve to detect a break-open attempt and to trigger an alarm. Furthermore, a change in the occupancy state of the lock body 13 that is detected by the sensors 17 and 19 and that is not due to an action of an authorized user may indicate such an attempt such that the alarm device 31 may also take into account the signals of the sensors 17 and 19 for recognizing a break-open attempt. The triggered alarm signal may be transmitted by the radio module 27 as a radio signal such that a user who is not in the direct environment of the lock 11 may also be informed of a break-open attempt and may initiate or perform the necessary measures to prevent a theft of the secured object.

Since the alarm device 31 is connected to the control circuit 21, it may also be controlled by means of the control circuit 21. In this respect, provision may in particular be made that the alarm device 31 may be switched off by the control circuit 21 such that the triggering of an alarm may be suppressed in specific situations. Thus, it is possible that the user, through the transmission of a radio signal received from the radio module 27, may cause the control circuit 21 to switch off the alarm device 31. This may, for example, be desired during a transport of the lock 11 during which usually no disturbing alarm, in particular due to detected vibrations, is to be triggered. Furthermore, the control of the alarm device 31 may also take place in dependence on or while taking account of the current occupancy state of the lock body 13. For example, the control circuit 21 may be configured to automatically switch off the alarm device 31 if it is detected that no securing part 15 is introduced into the lock body 13 and said securing part 15 is therefore not in use. Due to this temporary switching off of the alarm device 31, the energy requirement of the lock 11 may in particular be reduced such that the uninterrupted usability of the lock 11 may be extended without the necessity of changing or charging an electrical energy source, not shown. For the purpose of saving energy, provision may also be made to be able to temporarily switch off further components and in particular the radio module 27 and the GPS receiver 29 by means of the control circuit 21.

FIG. 2 shows a view of a cam 23 that cooperates with two latches 25 and 26 that moves them into their locked positions in each case. In this respect, the cam 23 is arranged on a circular and disk-like support element 45 and is rotatable in any desired manner in both directions about an axis of rotation D that extends through the center of the circular support element 45. Due to the contact with the cam 23, the latches 25 and 26 may, independently of one another, be selectively moved in the direction of or into a locked position or released by the cam 23 for a movement into the unlocked position. In this respect, the latches 25 and 26 may be spring-preloaded into the locked position shown, as explained in connection with FIG. 1.

The latches 25 and 26 each have a radially inwardly disposed contact region 39. These contact regions 39 are each rounded in the radial direction such that the transfer of the respective latch 25 or 26 from the locked position shown into an unlocked position may take place smoothly and uniformly. Due to this radial rounding of the contact region 39, the respective latch 25 or 26 may be guided extending uniformly along the cam 23 during the transfer.

The latches 25 and 26 further each have an engagement region 41 that is rounded in the axial direction and that, as shown in FIG. 1 and FIGS. 3A and 3B, may engage into a recess 36 formed at a securing part 15 to lock said securing part 15. Due to this rounded design of the engagement region 41, a uniform and smooth engagement into the respective recess 36 of the securing part 15 may take place during the locking or a smooth urging back of the latches 25, 26 from the respective recess 36 of the securing part 15 may take place during the removal of the securing part 15 from or out of the lock body 13.

The latches 25 and 26 have lateral, wing-shaped guide sections 43 in the upper region. During the movement of the latches 25 and 26 in the radial direction, said guide sections 43 may engage in a form-fitted manner into linear guides, which are not shown and which are, for example, formed in a groove-like manner at the lock body 13, in order to enable a uniform guidance of the latches 25 and 26 perpendicular to the introduction openings 14 and 16 of the lock body 13.

Furthermore, due to such an engagement of the wing-shaped guide sections 43 into groove-like guides, the axial positioning of the latches 25 and 26 may be stabilized such that they may be secured against a force developed in the axial direction during a break-open attempt. Furthermore, due to the mutual engagement explained, the guide sections 43 form a particularly effective abutment to prevent the latches 25, 26 from moving too deeply into the introduction openings 14, 16 or from falling into them when no securing part 15 is inserted into the lock body 13 or into the respective introduction opening 14, 16.

FIGS. 3A and 3B illustrate the possibility of flexibly introducing and locking a securing part 15, which is configured as a U hoop and which has a long limb 33 and a short limb 35, through the movement of the cam 23 into different rotational positions.

In the third rotational position (S3) in FIG. 3A, the securing part 15 is completely introduced into the lock body 13, wherein the long limb 33 is introduced into the introduction opening 14 and the short limb 35 is introduced into the introduction opening 16. Both latches 25 and 26 are brought into the locked position by a corresponding rotation and setting of the cam 23 performed by means of the electric motor 24. As the plan view of the lock body 13 shown in the lower section with respect to the rotational position (S3) shows, the cam 23 in this respect has a radial extent of the same kind in the direction of the two introduction openings 14 and 16 such that the latches 25 and 26 are brought into the locked position by a cooperation of the respective contact regions 39 with the cam 23 and the engagement regions 41 lock the securing part 15 in both introduction openings 14 and 16.

In the first rotational position (S1), only the long limb 33 of the securing part 15 is held in the introduction opening 14 by an engagement of the latch 25 into the peripheral notch 37 while the short limb 35 is completely released from the lock body 13 and removed from the associated introduction opening 16. This position may, for example, make it possible to pivot the securing part 15 about the long limb 33 and to guide the short limb 35 through an object to be secured, whereupon said object may be secured to the lock 11 in accordance with the rotational position (S3) by locking both limbs 33 and 35. To be able to pull the securing part 15 far enough out of the lock body 13 during this part unlocking (until the removal movement is limited by the engagement of the latch 25 into the notch 37), the long limb 33 of the securing part 15 may be flattened between the recess 36 and the peripheral notch 37.

In this rotational position (S1), the cam 23 has a larger radial extent in the direction of the introduction opening 14 than in the direction of the introduction opening 16 such that the latch 25 is moved in the direction of the locked position by a cooperation of the contact region 39 with the cam 23 and the long limb 33 is held in the introduction opening 14 by an engagement of the engagement region 41 of the latch 25 into the peripheral notch 37. In contrast, the latch 26 associated with the introduction opening 16 is released by the cam 23 and is in the unlocked position, for which purpose the cam 23 has a smaller extent in the direction of this introduction opening 16.

The following must still be remarked with respect to the rotational position (S1): Since the depth of the peripheral notch 37 is smaller than the depth of the recess 36 of the long limb 33, the latch 25 is in this respect not completely present in the locked position in accordance with the rotational position (S3), but rather in a locking intermediate position. In this locking intermediate position, the latch 25 indeed locks the securing part 15 in the sense of a blocking against a release from the lock body 13; however, the latch is set back in the direction of the cam 23 relative to the locked position in accordance with the rotational position (S3) in order to enable the explained pivot movement of the securing part 15. Accordingly, in the rotational position (S1), the radial extent of the cam 23 facing in the direction of the first introduction opening 14 is smaller than the radial extent of the cam 23 facing in the direction of the first introduction opening 14 in the rotational position (S3). Alternatively, it is, however, also possible that, in the rotational position (S1), the radial extent of the cam 23 facing in the direction of the first introduction opening 14 is just as large as the radial extent of the cam 23 facing in the direction of the first introduction opening 14 in the rotational position (S3) in order also to displace the latch completely into the locked position in the rotational position (S1).

The rotational position (S1) of FIG. 3A may, for example, also be provided to introduce and to lock a securing part configured as a bolt into the introduction opening 14, while the latch 26 associated with the introduction opening 16 remains in the unlocked position to enable a possible subsequent introduction of a further securing part into the introduction opening 16.

In the fourth rotational position (S4) in accordance with FIG. 3A, both latches 25 and 26 are released by the cam 23 for a movement into the unlocked position such that the securing part 15 may be released from the lock body 13. In this rotational position (S4), the cam 23 again has an extent of the same kind in the direction of the two introduction openings 14 and 16 such that both latches 25 and 26 move into the unlocked position. Due to the possibility of controlling this rotational position by means of the electric motor 24, the securing part 15 may thus both be released and removed from the lock body 13 and introduced into it again. It may thereby, for example, be possible to lock different securing parts 15 to the lock body 13 and to remove them again depending on the current use of the lock 11 such that a user may flexibly use the lock 11 in a manner adapted to his respective requirements.

FIG. 3B shows further rotational positions of the cam 23, wherein the securing part 15 configured as a U hoop having limbs 33 and 35 of different lengths is introduced in the reverse orientation into the lock body 13. The long limb 33 is consequently introduced into the introduction opening 16 for locking and the short limb 35 is introduced into the introduction opening 14 for locking.

In the rotational position (S5), the securing part 15 is completely introduced into the lock body 13, wherein it is locked in the introduction openings 14 and 16 by the two latches 25 and 26. For this purpose, the cam 23 is guided into the fifth rotational position (S5), wherein said fifth rotational position results from a rotation about 180° from the rotational position (S3) of FIG. 3A. In this rotational position (S5), the cam 23 again has an extent of the same kind in the direction of the two introduction openings 14 and 16 such that the latches 25 and 26 are brought into the locked position by a cooperation of the contact regions 39 with the cam 23. Both limbs 33 and 35 are locked in the introduction openings 16 and 14 by an engagement of the engagement regions 41 into the recesses 36.

In the second rotational position (S2), the cam 23 has a larger radial extent in the direction of the introduction opening 16 than in the direction of the introduction opening 14. This rotational position (S2) may in particular result from a rotation about 180° from the first rotational position (S1). As explained in connection with the rotational position (S1), provision may be made by a corresponding design of the cam 23 that the latch 26 in this respect only adopts a locking intermediate position. In this rotational position of the cam 23, the long limb 33 may thus be held in the introduction opening 16 while the short limb 35 may be completely released from the lock body 13. The securing part 15 may thus be pivoted about the long limb 33 to guide the short limb 35 through an object to be secured. This setting of the cam 23 in which the securing part 15 is pivotably held about the long limb 33 may consequently be achieved independently of the side by the rotational positions (S1) and (S2) such that the securing part 15 may be introduced in any desired orientation into the lock body 13 and may be locked as desired. A user may thus perform the introduction of the securing part 15 comfortably and without having to pay attention to a correct orientation, without restrictions arising in the functionality of the lock 11.

In this rotational position, a securing part, for example a bolt, which is merely to be introduced into the introduction opening 16 for locking, may also be locked, while the latch 25 remains in the unlocked position to enable a subsequent introduction of a further securing part into the introduction opening 14. The introduction and removal of securing parts to be locked in only one of the introduction openings 14 or 16 may thus also take place comfortably and in any desired order.

The sixth rotational position (S6) in accordance with FIG. 3B results from the fourth rotational position (S4) through a rotation of the cam about 180°. The cam 23 here also has an extent of the same kind in the direction of the two introduction openings 14 and 16 such that both latches 25 and 26 are released for a movement into the unlocked position and the securing part 15 may be released and removed from the lock body 13.

Due to the possibility of transferring the cam 23 in particular into the rotational positions (S1), (S2), (S3), and (S4), a flexible use of the lock 11 may thus be achieved since any desired number of the latches 25 and 26 may be brought into the locked position independently of one another and the respective shown introductions and lockings of the securing part 15 may be achieved with any desired orientation. Since the functionality of the lock 11 may be ensured independently of the orientation of the introduced securing part 15, a user does not at all have to ensure a correct introduction and may introduce the securing part 15 in any desired manner without any restrictions resulting in the usability of the lock 11.

Furthermore, the securing part 15 may be released and completely removed from the lock body 13 by a control of the rotational position (S4). A user may thus subsequently insert a securing part adapted to the respective use of the lock 11 into the introduction openings 14 and 16 and may selectively lock said securing part to the lock body 13. For this purpose, as FIG. 4 schematically illustrates, the portable electronic lock 11 may, for example, be a part of a lock system that, in addition to the securing part 15 configured as a U hoop, comprises two further securing parts 47 that are configured as bolts and that may be locked to the lock body 13 independently of one another.

In the occupancy state (A) of the lock body 13 shown in FIG. 4, the securing part 15 that is configured as a U hoop is completely introduced into the lock body 13 and is locked thereto, wherein the long limb 33 is introduced into the introduction opening 14 and the short limb 35 is introduced into the introduction opening 16. Both latches 25 and 26 are brought into the locked position by a setting of the cam 23 into the third rotational position (S3) (cf. FIG. 3A), wherein this setting may take place by a control of the electric motor 24 by means of the control circuit 21 and by a rotation of the cam 23 about the axis of rotation D.

Due to a control of the fourth rotational position (S4) (cf. FIG. 3A), the securing part 15 may be released and removed from the lock body 13. Subsequently, a securing part 47 configured as a bolt may, for example, be introduced into the introduction opening 14, which corresponds to the occupancy state (B) of the lock body 13 in FIG. 4. This securing part 47 may be locked by a setting of the cam 23 into the first rotational position (S1) (cf. FIG. 3A) by the latch 25 associated with the introduction opening 14, while the latch 26 associated with the introduction opening 16 remains in the unlocked position.

Since the latch 26 is located in the unlocked position in the first rotational position, a further securing part 47 configured as a bolt may thereupon, for example, be introduced into the free introduction opening 16 of the lock body 13 to be locked to the lock body 13 in the occupancy state (C) of FIG. 4. For this purpose, the cam 23 may again be brought into the rotational position (S3) (cf. FIG. 3A) such that both latches 25 and 26 are brought into the locked position for locking the securing parts 47 to the lock body 13.

Since, in the second rotational position (S2) (cf. FIG. 3B), the latch 26 may further be brought into the locked position, while the latch 25 is released for a movement into the unlocked position, the consecutive insertion and locking of two securing parts 47 configured as bolts may also be performed in any desired order and the removal of one or both securing parts 47 may also take place in any desired manner. Thus, for example starting from the occupancy state (C) of FIG. 4, the user may selectively remove the securing part 47 locked in the introduction opening 16 by a control of the rotational position (S1) (cf. FIG. 3A) or remove the securing part 47 locked in the introduction opening 14 by a control of the rotational position (S2) (cf. FIG. 3B). The order of the introduction of the securing parts 47 may also take place in any desired manner since, as shown, a securing part 47 is first introduced into the introduction opening 14 and locked in the rotational position (S1) (cf. FIG. 3A), while it is also possible to first lock a securing part 47 by a control of the position (S2) (cf. FIG. 3B). It is generally also conceivable that only one securing part 47 is locked to the lock body 13 in the rotational position (S1) or (S2), while the respective other introduction opening 16 or 14 remains free or is otherwise closed in order thereby to prevent the entry of dirt or liquid into the lock body 13. Consequently, a use of securing parts 47 configured as bolts may also take place with a high degree of flexibility without restrictions occurring in the functionality of the lock 11.

Due to the controllability of the rotational positions (S5) and (S6), desired rotational positions may furthermore be set as directly as possible and without the necessity of guiding the cam 23 over further rotational positions.

The free electromotive settability of the cam 23 consequently allows a flexible and comfortable use of the portable electronic lock 11 in that any desired number and selection of the latches 25 and 26 may be brought into the locked position or released for a movement into the unlocked position in a freely selectable and mutually independent manner. A plurality of different securing parts, for example U hoop-shaped securing parts 15 or securing parts 47 configured as bolts, may be flexibly locked to or released from the lock body 13 such that a user of the lock 11 may introduce and lock a securing part, which is in each case adapted to the current area of use of the lock 11, in any desired manner.

REFERENCE NUMERAL LIST

11 portable lock
13 lock body

14 introduction opening
15 (U hoop-shaped) securing part
16 introduction opening
17 first sensor
19 second optical sensor
21 control circuit
22 locking device
23 cam
24 electric motor
25 first latch
26 second latch
27 radio module
29 GPS receiver
31 alarm device
33 long limb of a U hoop
35 short limb of a U hoop
36 recess
37 notch
39 contact region
41 engagement region
43 guide section
45 support element
47 further securing part (bolt)

The invention claimed is:

1. A portable electronic lock, comprising a lock body and at least one securing part,
   wherein the at least one securing part can be selectively locked to the lock body or released from the lock body, and
   wherein the lock body comprises:
   a first introduction opening and a second introduction opening for introducing a respective section of the at least one securing part into the lock body;
   an electromechanical locking device that has a first latch and a second latch, a cam rotatable about an axis of rotation, and an electric motor for driving the cam; and
   a control circuit;
   wherein the first latch can be displaced from an unlocked position into a locked position in which the first latch engages into the first introduction opening in order to lock the at least one securing part in the first introduction opening, and wherein the second latch can be displaced from an unlocked position into a locked position in which the second latch engages into the second introduction opening in order to lock the at least one securing part in the second introduction opening;
   wherein the cam is configured,
   in a first rotational position, to displace the first latch in the direction of the locked position and to release the second latch for a movement into the unlocked position;
   in a second rotational position, to displace the second latch in the direction of the locked position and to release the first latch for a movement into the unlocked position;
   in a third rotational position, to displace the first latch and the second latch in the direction of the locked position; and
   in a fourth rotational position, to release the first latch and the second latch for a movement into the unlocked position; and
   wherein the control circuit is configured to control the electric motor to selectively drive the cam into the first, the second, the third, or the fourth rotational position.

2. A portable electronic lock in accordance with claim 1, wherein, with respect to the axis of rotation, the cam,
   in the first rotational position, has a larger extent in the direction of the first introduction opening than in the direction of the second introduction opening;
   in the second rotational position, has a larger extent in the direction of the second introduction opening than in the direction of the first introduction opening;
   in the third rotational position, has a first extent of the same kind in the direction of the first introduction opening and in the direction of the second introduction opening; and,
   in the fourth rotational position, has a second extent of the same kind, which is smaller than the first extent of the third rotational position, in the direction of the first introduction opening and in the direction of the second introduction opening.

3. A portable electronic lock in accordance with claim 2, wherein the cam can be displaced with respect to the axis of rotation by a rotation about 180° in at least one of the following manners:
   from the first rotational position into the second rotational position: from the third rotational position into a fifth rotational position in which the cam has the first extent in the direction of the first introduction opening and in the direction of the second introduction opening: or
   from the fourth rotational position into a sixth rotational position in which the cam has the second extent in the direction of the first introduction opening and in the direction of the second introduction opening.

4. A portable electronic lock in accordance with claim 1, wherein the cam is freely rotatable about at least 360°.

5. A portable electronic lock in accordance with claim 1, wherein the electric motor has a reduction gear and/or is self-locking.

6. A portable electronic lock in accordance with claim 1, wherein the first latch and the second latch are spring-preloaded in the direction of their respective locked position.

7. A portable electronic lock in accordance with claim 1, wherein the first latch and the second latch are linearly movably guided in the lock body.

8. A portable electronic lock in accordance with claim 1, wherein, with respect to the axis of rotation, the first latch and the second latch have a radially inwardly disposed contact region for cooperating with the cam and a radially outwardly disposed engagement region for cooperating with the at least one securing part for the locking of said at least one securing part, wherein at least one of the contact region or the engagement region is at least sectionally rounded.

9. A portable electronic lock in accordance with claim 1, wherein the first latch and the second latch have lateral guide sections, wherein the guide sections are wing-shaped or groove-like and cooperate with a linear guide formed at the lock body.

10. A portable electronic lock in accordance with claim 1, wherein a first sensor for detecting the securing part introduced into the lock body and for generating corresponding detection signals is associated with the first introduction opening, and wherein a second sensor for detecting the securing part introduced into the lock body and for generating corresponding detection signals is associated with the second introduction opening.

11. A portable electronic lock in accordance with claim 10,
   wherein the respective sensor has an electromechanical contact switch, a capacitive proximity switch, a magnetic switch, an optoelectronic interruption switch, or an optoelectronic proximity switch.

12. A portable electronic lock in accordance with claim 10, wherein the control circuit is configured to determine a current occupancy state of the lock body in dependence on the generated detection signals, wherein the the control circuit is configured to associate different combinations of generated detection signals with different occupancy states of the lock body.

13. A portable electronic lock in accordance with claim 12, wherein the control circuit comprises a non-volatile memory in which respective information on permitted positions of the first latch and the second latch is stored for the different occupancy states of the lock body.

14. A portable electronic lock in accordance with claim 12, wherein the control circuit is configured to control the electromechanical locking device in dependence on the generated detection signals.

15. A portable electronic lock in accordance with claim 12, wherein the lock body has a radio module that is connected to the control circuit, and wherein the radio module is configured to transmit the current occupancy state of the lock body as a radio signal.

16. A portable electronic lock in accordance with claim 1, wherein the lock body has a radio module that is connected to the control circuit, wherein the radio module is configured to receive a control command for the electromechanical locking device by radio, wherein the control circuit is configured to control the electromechanical locking device in response to the received control command.

17. A portable electronic lock in accordance with claim 1, wherein the lock body has an alarm device that comprises at least one of: a circuit monitoring, a tamper contact, sensors associated with the introduction openings, an acceleration sensor, and/or a vibration sensor.

18. A lock system comprising a portable electronic lock in accordance claim 1 and at least one further securing part, wherein the at least one securing part and the at least one further securing part are configured to trigger the generation of different combinations of detection signals when either the at least one securing part or the at least one further securing part is introduced into the introduction openings of the lock body.

19. A portable electronic lock comprising a lock body and at least one securing part, wherein the at least one securing part can be selectively locked to the lock body or released from the lock body, and wherein the lock body comprises:

a first introduction opening and a second introduction opening for introducing a respective section of the at least one securing part into the lock body;

an electromechanical locking device that has a first latch and a second latch, a cam rotatable about an axis of rotation, and an electric motor for driving the cam; and a control circuit;

wherein the first latch can be displaced from an unlocked position into a locked position in which the first latch engages into the first introduction opening in order to lock the at least one securing part in the first introduction opening, and wherein the second latch can be displaced from an unlocked position into a locked position in which the second latch engages into the second introduction opening in order to lock the at least one securing part in the second introduction opening;

wherein the cam is configured, in a first rotational position, to displace the first latch in the direction of the locked position and to release the second latch for a movement into the unlocked position;

in a second rotational position, to displace the second latch in the direction of the locked position and to release the first latch for a movement into the unlocked position;

wherein the control circuit is configured to control the electric motor to selectively drive the cam into the first or the second rotational position.

* * * * *